March 24, 1925.　　　　　　　　　　　　　　　1,530,953
W. H. McCANDLISH
MACHINE FOR MOLDING AND PRESSING CONCRETE AND SIMILAR
MATERIAL INTO BLOCK FORM
Filed June 9, 1922　　　　　3 Sheets-Sheet 1

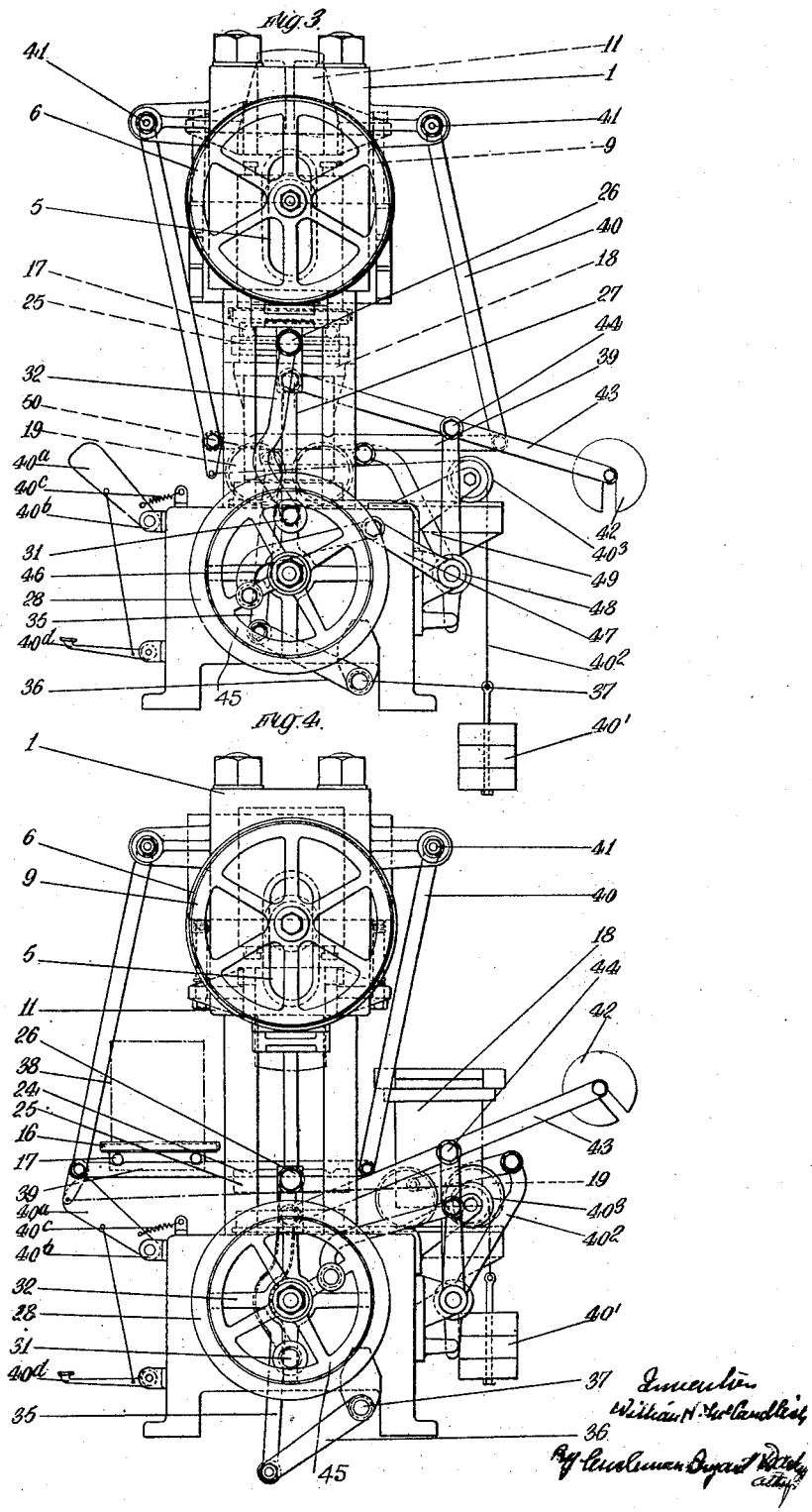

March 24, 1925.
W. H. McCANDLISH
MACHINE FOR MOLDING AND PRESSING CONCRETE AND SIMILAR
MATERIAL INTO BLOCK FORM
Filed June 9, 1922   3 Sheets-Sheet 3
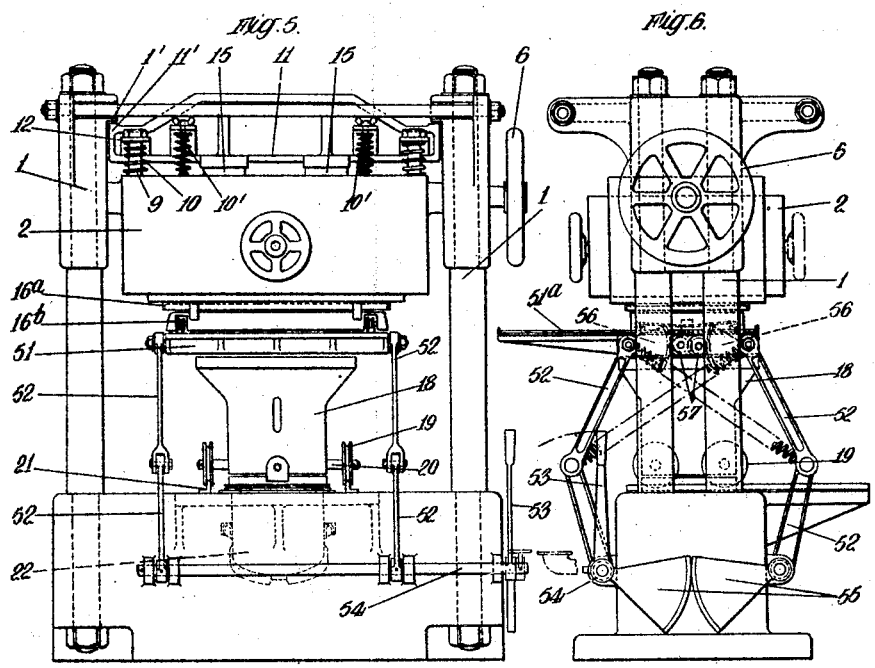
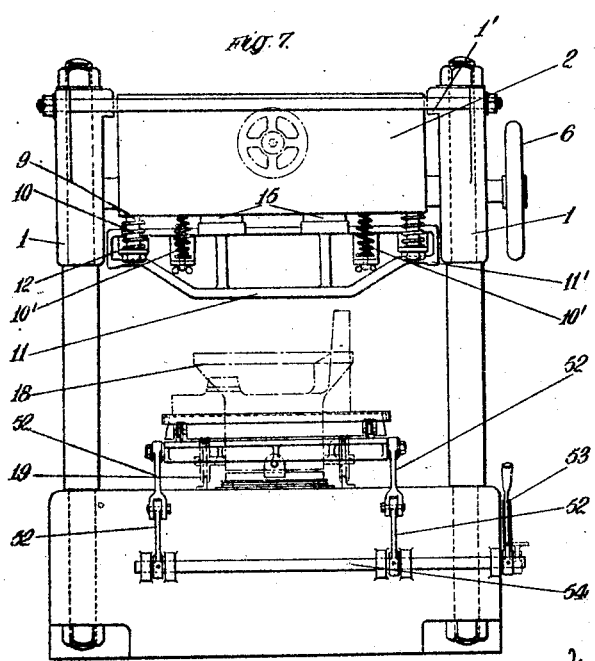

Patented Mar. 24, 1925.

1,530,953

UNITED STATES PATENT OFFICE.

WILLIAM HERBERT McCANDLISH, OF WARE, ENGLAND, ASSIGNOR OF ONE-THIRD TO SABULITE (GREAT BRITAIN) LIMITED, OF LONDON, ENGLAND, A BRITISH COMPANY, AND ONE-THIRD TO JOHN BELLINGHAM, OF ST. CLEMENTS, JERSEY, CHANNEL ISLANDS, ENGLAND.

MACHINE FOR MOLDING AND PRESSING CONCRETE AND SIMILAR MATERIAL INTO BLOCK FORM.

Application filed June 9, 1922. Serial No. 567,123.

*To all whom it may concern:*

Be it known that I, WILLIAM HERBERT McCANDLISH, a subject of the King of Great Britain, and a resident of High Cross, Ware, in the county of Herts, England, have invented certain new and useful Improvements in or Relating to Machines for Molding and Pressing Concrete and Similar Material Into Block Form, of which the following is a specification.

This invention relates to machines for molding and pressing concrete and similar materials into block form and particularly to those machines in which the material to be pressed is contained within a downwardly discharging mould box which is mounted in trunnions so that it can be inverted for filling or charging, after which the open top is closed by a pallet and the mould box again reversed.

In accordance with the invention I provide a molding machine in which the pressure is applied to the material within the mould box by means of a hydraulic ram adapted to raise the mould box and cause a pressing member or head associated therewith to come into contact with a stationary portion of the machine. An important feature of the invention resides in the provision of means whereby the stroke of the ram may be restricted to a distance corresponding approximately to the extent to which the material is to be compressed while at the same time allowing for sufficient downward movement of the moulded block to enable it to be discharged from the mould box and removed bodily from the machine thus enabling the volume of water and consequently the power of the electrical or other pump or pumps used for supplying the same to be considerably less than would otherwise be the case.

The pressure is transmitted from the aforesaid pressing member or head to the material within the mould box by means of a movable pressing or molding plate or block adapted to impart the desired contour to the upper surface of the block to be moulded, which plate rests upon the material in the mould box and has upwardly extending legs adapted when the mould box is raised by the ram to come into contact with the pressing head.

The mould box employed is of the kind having pivoted side and end walls which are adapted to be opened to discharge the moulded block upon its pallet onto a tray or table and in the construction according to the invention the said tray or table supporting the moulded block is adapted to be moved by lever mechanism into a position from which it may easily be removed from the machine. The said tray or table is supported beneath the mould box during the pressing operation by a member which I term a "stool" interposed between the same and the head or piston of the ram, the said stool being provided with wheels running on rails or ways so that it may be run out on said rails when the pressure of the ram is released so as to permit of the discharge of the moulded block from the mould box and its removal from the machine as above stated, the provision of the stool permitting of the stroke of the ram being restricted to a distance approximately corresponding with the extent of compression of the material in the mould box.

In order that the said invention may be clearly understood and readily carried into effect, I will now proceed to describe the same more fully with reference to the accompanying drawings in which:—

Figure 3 is a side view corresponding with Figure 1.

Figure 4 is a similar view showing the parts in the position they assume at the conclusion of the pressing operation with the moulded block in position for removal from the machine.

Figures 5 and 6 are respectively a front elevation and a side elevation of a second embodiment of the invention showing the parts in pressing position and Figure 7 is a front elevation corresponding with Figure 5 but with the mould box inverted for refilling and with the moulded block in position for removal.

Figure 1:
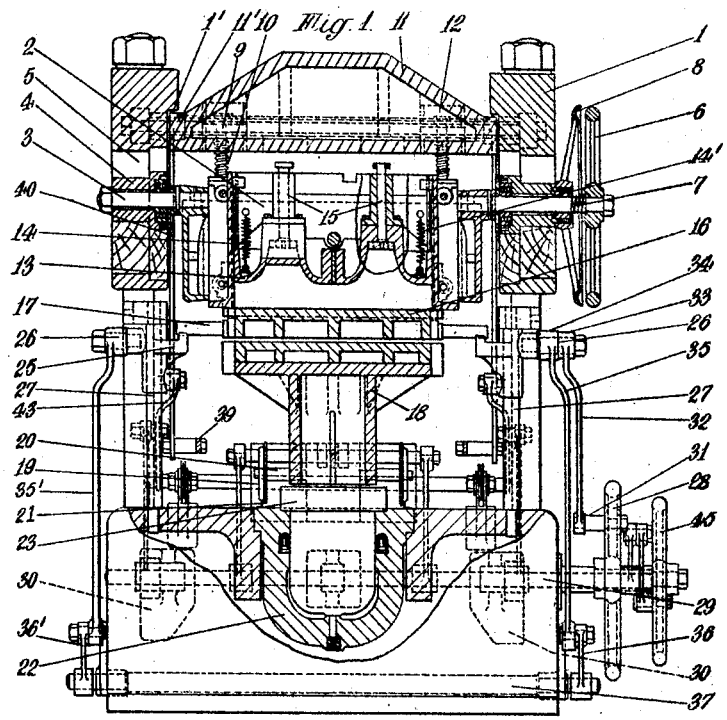
Figure 1 is a part sectional view of one embodiment of the invention, the parts being represented in molding position.
Figure 2:
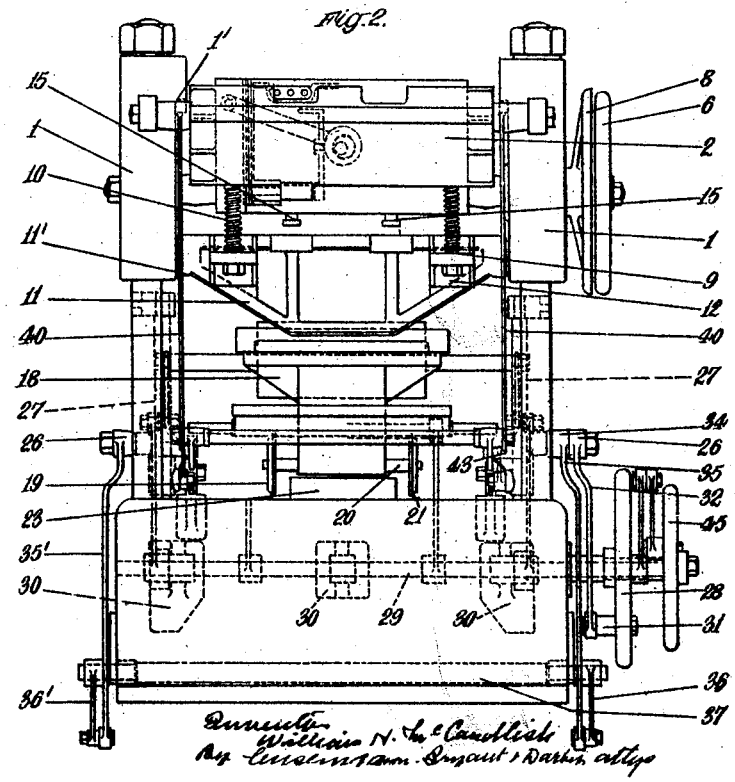
Figure 2 is a front elevation of the machine illustrated in Figure 1 with the mould box inverted for filling or charging.

Referring first to Figures 1 to 4 of the drawings, which illustrate the preferred embodiment of the invention, 1 represents the framework of the machine and 2 the mould box, the trunnions 3 of which are rotatable in bearings 4 vertically movable in slots 5 in the frame members 1. For the sake of convenience the form of mould box illustrated is that described in the specification of the earlier Patent No. 1,442,283, dated January 16, 1923 and its construction is, therefore, not herein described in detail, although it will be understood that I do not desire to confine myself to the use of this particular form of mould box as this may be of any form which is inverted for filling or charging and the open end closed by a pallet, and having pivoted side walls and actuating means by which the said side walls may be displaced outwards to enable the finished block to be discharged on its pallet onto a table or tray. For rotating the mould box 2 a hand wheel 6 is provided, which is adapted to be moved against the action of a spring 7 into engagement with the clutch wheel 8. Connected with the mould box 2 by bolts 9 surrounded by compression springs 10 is the pressing head 11, the ends 11' of which normally are spaced apart from the overhanging parts or projections 1' of the frame members 1 only a sufficient extent to permit of the pressing head rotating with the mould box when the latter is inverted. The bolts 9 are capable of slight vertical movement in slots or recesses 12. Located in the mould box 2 is a pressing plate or block 13 the shape of which is suitably chosen to suit the contour desired for the moulded block, the pressing plate 13 being held up by springs 14 against screwed pins 14' which act to regulate the thickness of the block by controlling the amount of material placed in the mould box. Extending upwardly from and slidable relatively to the pressing plate 13 are legs or pistons 15 the ends of which as shown in Figure 1 are normally spaced apart from the pressing head 11 but are adapted to come into contact with the pressing head when upon the mould box and pressing head being lifted by the ram as hereinafter explained the ends 11' of the pressing head engage the projections 1' of the frame. The pressure of the ram continuing to raise the mould box the legs or pistons 15 are forced downwards and compress the material in the part of the mould which forms the lugs or brackets on the finished block. When the enlarged ends of the legs 15 reach the upper surface of the movable portion of the mould they carry this downwards and so compress the whole of the material in the mould box.

The moulded block when discharged from the mould box is, with its pallet, received upon a tray 16 having four pins 17, and is then ready for moving into a position from which it can easily be removed clear of the machine as will hereinafter be explained. Located beneath the tray 16 (in the position shown in Figure 1) is a "stool" or distance piece 18 the upper face of which in the position shown is spaced slightly away from the under surface of the tray 16. The said stool 18 is furnished with wheels 19 which wheels rest upon rails 21 supported upon a portion of the horizontal framework of the machine. 22 represents diagrammatically the hydraulic ram, the piston 23 of which is adapted to come into contact with the under surface of the stool 18, and raises the latter and consequently also the tray 16, mould box 2 and pressing head 11, to cause the ends 11' of the latter to engage with the projections 1' of the frame members 1, whereupon as above described the ends of the legs or pistons 15 will be pressed downwardly to cause the plate or block 13 to compress the material in the mould. During this operation, the wheels 19 mounted on axles 20 of the stool 18 are raised from the rails 21. It will be understood that the connections for the supply of fluid to the ram have been omitted for the sake of clearness, but it will be obvious that a three-way or other suitable valve or other controlling means may be provided for regulating the movements of the ram.

The pins 17 of the tray 16 rest (while the parts are in the position shown in Figure 1) in notches (24) in brackets 25 carried by cross heads 26 which brackets are slidable on guide rods 27.

The brackets 25 carried by the cross heads 26 are moved up and down on the guide rods 27 by a system of levers actuated by the hand wheel 28 which is mounted upon a shaft 29 extending transversely of the machine and rotatable in bearings carried by brackets 30. This system of levers comprises a link 31 secured to the hand wheel 28 to which link is connected a rod 32, the cross head 26 of which is mounted upon a pin 33 which is common to the cross head 34 of a rod 35. The rod 35 is connected by the link 36 with a transverse shaft 37 which at its other end carries a link 36' connected to a rod 35' which carries the other cross head 26. It will be seen that by rotating the hand wheel 28 the brackets 25 carrying the moulded block 38 upon its tray 18 will be caused to slide downwardly upon the rods 27. This downward movement is continued until the pins 17 of the tray engage in notches or recesses in the bottom members 39 of a swinging frame 40 which is pivoted to the brackets 41 projecting from the frame members 1 of the machine. The cross heads 26 and brackets 25 are then further lowered until they are clear of the pins 17 on the tray 16 which is then left supported upon the swinging frame 40 which may then be swung about its pivot to the front of the machine and locked in this position while the block is removed, after which it may be returned to its initial-position and the cross heads 26 and brackets 25 again raised to pick up the tray 16 from the frame so that it may fit into the next pallet in use on the mould box. For holding the swinging frame in its outward position while the block is being removed, an abutment member 40ᵃ is preferably provided said member 40ᵃ being pivoted to a lug 40ᵇ and adapted to be drawn downwardly against the action of a spring 40ᶜ by a pedal 40ᵈ. The pedal is depressed and the frame 40 swung outwardly; the pedal being then released the member 40ᵃ will rise into contact with the under side of the frame 40 and prevent the latter swinging back. For freeing the frame the pedal is again depressed. The swinging frame 40 is normally held in position to receive the tray 16 by a weight 40′ on a chain, rope or the like 40² working over a pulley 40³.

The weight of the cross heads, tray, pallet, and block is counterbalanced by a weight 42 carried by an arm 43 pivoted at 44 and in order to prevent the weight 42 prematurely lifting the cross heads 26 after they have been lowered to permit the removal of the moulded block it is necessary to give the hand wheel 28 more than a half revolution in order to lock the cross heads in their lowered position. The weight 42 is made slightly in excess of that of the moving parts in order that when the mould box is opened to deliver the green block the tray 16 may be held hard up against the pallet and prevent any movement which would injure the green block.

Before the tray 16 can be lowered as above described it is necessary to move the stool 18 from under it. This is done by running the stool out on the rails 21 into the position shown in Figure 4. For effecting this a second hand wheel 45 (Figures 1 and 2) is provided to which is connected a lever 46 which in turn is connected to a link 47 mounted upon a shaft 48 upon which is mounted a second link 49 connected to a lever 50 attached to the stool.

The sequence of operations in the form of the machine shown in Figures 1 to 4 above described is as follows:—The mould box 2 having been charged with the concrete or other material while in an inverted position the pallet is placed and clipped in position, the mould box being thereupon reversed, and the parts all brought into position represented in Figure 1, in which the tray 16 is supported on the brackets 25 beneath the mould and the stool 18 is located beneath the tray. The ram 22 is then operated and the stool, tray, mould box, and pressing head are then raised as above described in order to effect the compression of the material in the mould. Upon the conclusion of the pressing operation the pressure of the ram having been released the hand wheel 45 is given a half revolution to cause the stool 18 to be run out on its rails 21 from beneath the tray. The walls of the mould box are now opened and hand wheel 28 is thereupon actuated to lower the moulded block on its pallet resting on the tray until the pins 17 of the tray engage in the notches in the bottom members 39 of the swinging frame 40, and the lowering movement of the brackets 25 is continued until the pins 17 are entirely free of the latter leaving the tray, pallet and block supported on the swinging frame which is then swung out by hand to the front of the machine, and the moulded block and pallet removed leaving the tray on the frame. While the parts are in this position the mould box is inverted and a fresh charge introduced thereinto after which it is returned to the position shown in Figure 1. The frame is then first returned to its initial position and cross heads 26 and brackets 25 are again raised by a reverse actuation of the hand wheel 28 so that the pins 17 are again engaged in the notches in the brackets 25, and the tray is lifted from the frame 40 and raised to its initial position as represented in Figure 1. The stool is then moved back into position under the tray and the same sequence of operations repeated.

Referring now to Figures 5 to 7 of the drawings, which represents a modified form of the invention, the same reference numerals are used to denote the parts corresponding to those illustrated in Figures 1 to 4; thus 1 shows the framework of the machine, 2 the mould box, 6 the hand wheel by which the latter is reversed, 9 are the bolts surrounded by spiral springs 10 connecting the pressing head 11 with the mould box 2, 11′ represents the ends of the pressing head 11 which are adapted to engage with the projections 1′ of the frame, 15 are the legs or pistons of the pressing plate 13, 18 is the stool, 19 the wheels therefor, mounted on axles 20, 21 are the rails therefor and 22 indicates the hydraulic ram. In addition to the springs 10, tension springs 10′ are in this form of the invention provided to connect together the mould and pressing head. The principal difference between this embodiment of the invention and that described in reference to Figures 1 to 4 is in respect of the mechanism for lowering and removing the moulded block and pallet. In the form illustrated in Figures 5 to 7 the tray 16ᵃ is carried upon wheels 16ᵇ which run upon rails upon a table 51 which is adapted to be raised and lowered by means of toggle levers 52 which are actuated by means of a hand lever 53 mounted upon a shaft 54, one pair of such toggle levers being operated by said hand lever 53 through the medium of segmental gears 55. For the purpose of balancing and steadying the movement of the toggle levers other segmental gears 56 meshing with idle rollers 57 may be provided.

In this form of the invention upon the ram being operated the stool, table, tray, mould box and pressing head are lifted in a manner similar to that described with reference to Figures 1 to 4 until the ends 11' of the pressing head engage with the projections 1' of the frame. In order to permit of this arrangement the construction of the table raising mechanism is such that when the hand lever 53 has been operated to its fullest extent the toggle levers are not fully extended, but are in the position shown in Figure 6 in which they are capable of a further extension to permit of the table being further raised under the action of the ram. Upon the conclusion of the molding operation, the stool 18 is run out on its rails from beneath the table, and the latter is lowered by means of the toggle levers into the position shown in Figure 7 in which position the tray carrying the moulded block and pallet may be run out on its rails on to the extension 51ᵃ of the table and thence removed by hand.

What I claim and desire to secure by Letters Patent of the United States is:—

1. A hydraulic machine for pressing and molding concrete and similar material into block form comprising a hydraulic piston, a stationary portion, a rotatably mounted mould box and a pressing head associated with the mould box and movable through the said mould box by the hydraulic piston into contact with the stationary portion.

2. A hydraulic machine for pressing and molding concrete and similar material into block form comprising, a hydraulic piston, a stationary portion, a reversible mould box capable of being moved to one position for charging with material and to inverted position for pressing and molding the material and a pressing head associated reversible with the mould box and capable of being moved into contact with the stationary portion by the said piston.

3. A machine of the kind referred to for molding and pressing concrete or similar material into block form, having a movable pressure plate or block adapted to rest upon the material in the mould box when the latter is in pressing position, the said pressure plate being suitably shaped to impart the desired contour to the upper surface of the moulded block and having upwardly extending legs or pistons which are adapted by the action of a hydraulic ram to be brought into contact with a pressing member or head which transmits the pressure of the ram through the said legs and pressure plate to the material in the mould box.

4. A hydraulic machine for pressing and molding concrete and similar material into block form comprising, a hydraulic piston, a stationary portion, a pressing head capable of being moved into engagement with the said stationary portion, a rotatable mould box fitted with a movable pressure plate and capable of being moved into engagement with the pressing head, and means which operate in conjunction with the pressing head and the movable pressure plate and effect relative movement between the mould box and the movable pressure plate.

5. A hydraulic machine for pressing and molding concrete and similar material into block form comprising, a stationary portion, a movable pressing head, a rotatable mould box, a movable pressure plate within the mould box, means disposed between the pressing head and movable pressure plate, a stool and a hydraulic piston capable of moving the stool towards the mould box, the said means against the pressing head, of effecting relative motion between the movable pressure plate and of moving the pressing head into engagement with the said stationary portion.

6. A molding machine in accordance with claim 3, in which the said legs or pistons are adapted to first compress the material in that part of the mould box which forms the lugs or brackets on the finished block and subsequently to move the pressing plate to compress the whole of the material within the mould box, substantially as described.

7. A hydraulic machine for pressing and molding concrete and similar material into block form comprising, a frame, a stationary portion in the form of lugs on the said frame, a pressing head movable to and from the said lugs, a mould box associated with the pressing head and a hydraulic piston capable of moving the mould box towards the pressing head and the pressing head into engagement with the lugs.

8. A hydraulic machine for pressing and molding concrete and similar material into block form comprising a stationary portion, a movable pressing head, a rotatable mould box associated with the pressing head, a movable pressure plate within the mould box, means which operate in conjunction with the pressing head and the movable pressure plate, a movable tray for receiving the moulded block from the mould box, mechanism for carrying and raising and lowering the tray, a stool movable to and from a position beneath the tray and a hydraulic piston for moving the said stool, tray, mould box, means and pressing head into contact with each other and towards the stationary portion and pressing and molding the material in the mould box.

9. A hydraulic machine for pressing and molding concrete and similar material into block form comprising, a stationary portion, a movable pressing head, a rotatable mould box associated with the pressing head, a movable pressure plate within the mould box, means which operate in conjunction with the pressing head and the movable pressure plate, a movable tray for receiving the moulded block from the mould box, brackets for supporting the tray, guide rods for the brackets, rods connected at one end to the brackets, a hand wheel with which the other ends of the rods are connected, a stool movable to and from a position beneath the tray and a hydraulic piston for moving the said stool, tray, mould box, means and pressing head into contact with each other and towards the stationary portion and pressing and molding the material in the mould box.

10. A hydraulic machine for pressing and molding concrete and similar material into block form comprising a stationary portion, a movable pressing head, a rotatable mould box associated with the pressing head, a movable pressure plate within the mould box, means which operate in conjunction with the pressing head and the movable pressure plate, a movable tray for receiving the moulded block from the mould box, mechanism for carrying and raising and lowering the tray, a stool movable to and from a position beneath the tray and a hydraulic piston for moving the said stool, tray, mould box, means and pressing head into contact with each other and towards the stationary portion and pressing and molding the material in the mould box, and a pivotally mounted frame capable of receiving the tray from the said mechanism and supporting it with the moulded block thereon.

WILLIAM HERBERT McCANDLISH.